(12) United States Patent
Daniell

(10) Patent No.: US 7,804,950 B2
(45) Date of Patent: Sep. 28, 2010

(54) METHODS, SYSTEMS, AND COMPUTER PROGRAM PRODUCTS FOR PROVIDING ROUTING OF COMMUNICATIONS

(75) Inventor: William Daniell, Kennesaw, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 1281 days.

(21) Appl. No.: 11/317,145

(22) Filed: Dec. 22, 2005

(65) Prior Publication Data

US 2007/0147595 A1 Jun. 28, 2007

(51) Int. Cl.
*H04M 3/42* (2006.01)

(52) U.S. Cl. .......................... 379/211.02; 379/207.02; 370/252

(58) Field of Classification Search ............ 379/207.02; 370/252
See application file for complete search history.

(56) References Cited

U.S. PATENT DOCUMENTS

2007/0036086 A1* 2/2007 Walter et al. ................ 370/252

* cited by examiner

*Primary Examiner*—Curtis Kuntz
*Assistant Examiner*—Karen L Le
(74) *Attorney, Agent, or Firm*—Cantor Colburn LLP

(57) ABSTRACT

Methods, systems, and computer program products for determining routings of communications. Methods include receiving a communication for a receiving party and determining one or more potential locations of the receiving party. A probability that the receiving party is at each of the potential locations is calculated based on a statistical model. It is determined which of the potential locations has the highest probability. Routing of the communication to the potential location with the highest probability is initiated.

20 Claims, 2 Drawing Sheets

METHODS, SYSTEMS, AND COMPUTER PROGRAM PRODUCTS FOR PROVIDING ROUTING OF COMMUNICATIONS

BACKGROUND

Exemplary embodiments relate generally to communications, and more particularly, to methods, systems and computer program products for determining routing of communications.

Application programs for routing incoming communications such as text and voice messages to specified destinations are commercially available. Typically, individuals have many potential locations where they may be contacted. For example, an individual may have a land-based telephone utilized while in the office, a mobile telephone for use while traveling, an office e-mail account, a home voice mail account and an instant messaging account. It has become increasingly time consuming to locate an individual (preferably in person by telephone or by instant message) because of the numerous potential locations (or destinations) of the individual. At any given point in time, the individual is likely to be monitoring only one or two of these locations for incoming communications. The person initiating the communication may have no way of knowing which location the receiving party is currently monitoring for incoming communications. It would be desirable for a communication being sent to the receiving party to be routed to a potential location of the receiving party with the highest probability of being currently monitored by the receiving party.

SUMMARY

Exemplary embodiments relate to methods, systems, and computer program products for determining routings of communications. Methods include receiving a communication for a receiving party and determining one or more potential locations of the receiving party. A probability that the receiving party is at each of the potential locations is calculated based on a statistical model. It is determined which of the potential locations has the highest probability. Routing of the communication to the potential location with the highest probability is initiated.

Systems for determining routings of communications include a processor and computer instructions executing on the processor for facilitating receiving a communication for a receiving party and determining one or more potential locations of the receiving party. A probability that the receiving party is at each of the potential locations is calculated based on a statistical model. It is determined which of the potential locations has the highest probability. Routing of the communication to the potential location with the highest probability is initiated.

Computer program products for determining routings of communications include a storage medium readable by a processing circuit and storing instructions for execution by the processing circuit for facilitating a method. The method includes receiving a communication for a receiving party and determining one or more potential locations of the receiving party. A probability that the receiving party is at each of the potential locations is calculated based on a statistical model. It is determined which of the potential locations has the highest probability. Routing of the communication to the potential location with the highest probability is initiated.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments determining how to route an incoming communication (e.g., a telephone call or an instant message) to a receiving party. The receiving party may be located at and monitoring one or more of several potential locations such as a cellular telephone, a business telephone, a home telephone, a business e-mail system and a personal digital assistant (PDA) device. Exemplary embodiments calculate the probability that the receiving party is located at each of the potential locations. In exemplary embodiments, the probability is based on where the receiving party was located in the past at the same time of day and/or day of week. Once the communication is routed, the statistical model utilized to calculate the probability is updated based on where (and whether) the receiving party was located. In exemplary embodiments, the statistical model is a Bayesian model.

Figure 1:
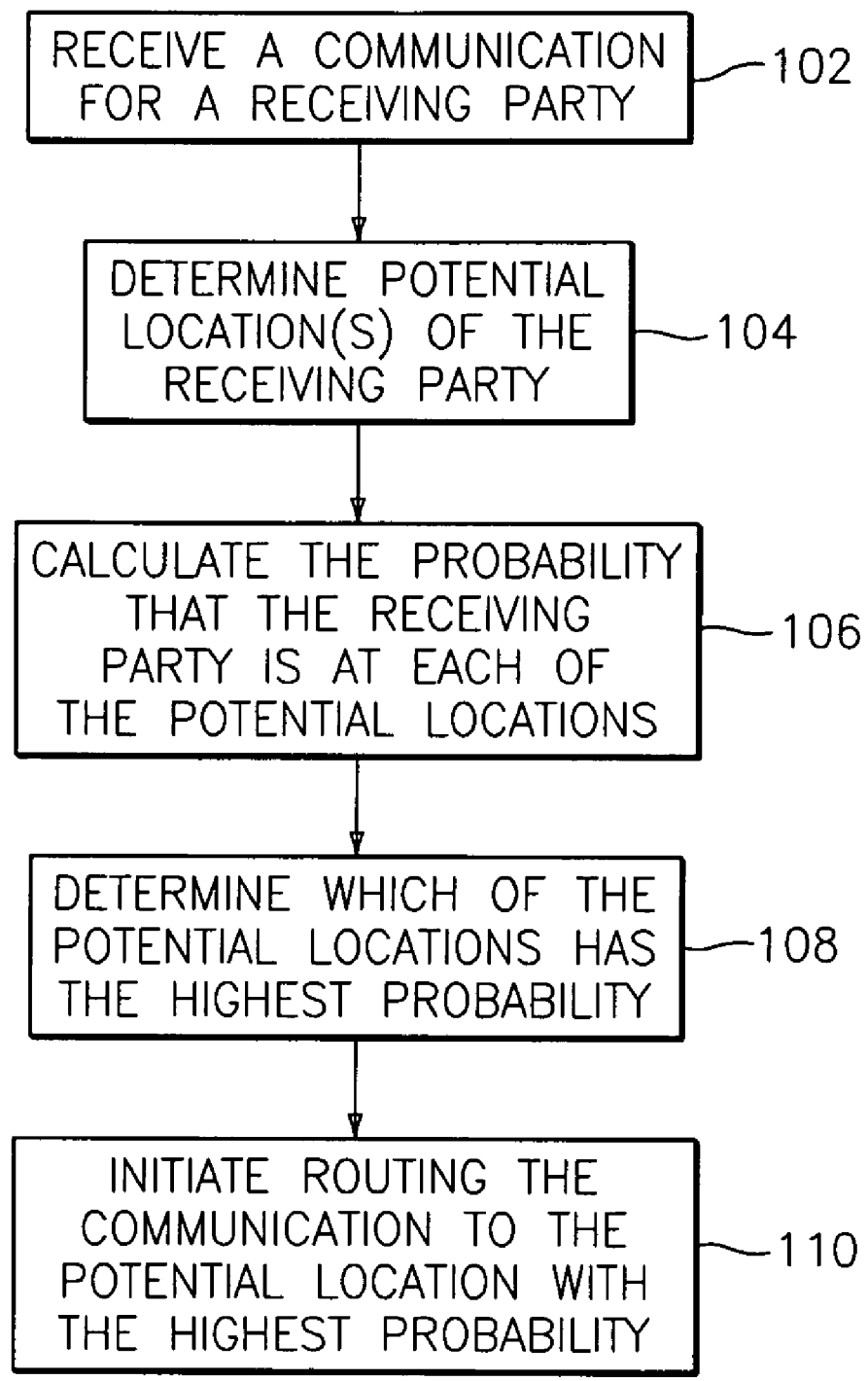
FIG. 1 is a flow diagram of an exemplary process for determining routing of communications.

FIG. 1 is a flow diagram of an exemplary process for determining routing of communications. In exemplary embodiments, the processing depicted in FIG. 1 is facilitated by computer instructions located on a host system or processor. At block 102, a communication is received for a receiving party. Communications include, but are not limited to: telephone calls and instant messages. When an analog termination occurs using a VOIP server, the VOIP server digitizes and encodes the audio signal using a standard audio encoding method. The standard method typically used is defined in the G.711 or G.729 standards documentation found at the IETF standards committee. Once digitized, the audio is then transmitted as digital data and decoded at the user's device. The digital audio packets can be routed based upon the network routing rules as described herein.

At block 104 in FIG. 1, one or more potential locations of the receiving party are determined. In exemplary embodiments, the potential locations are determined by performing presence based detection to find receiving party user devices that are currently in an active state. For example, the receiving party could be logged in to an account that provides instant messaging and/or the receiving party's cellular telephone may be currently powered on. These are both examples of user devices in an active state. In exemplary embodiments, the active state is known when a user's device notifies a presence server, such as a JABBER server, that is it online and available to receive information (e.g., calls, and/or text or multimedia based messages). If no receiving party locations are currently in an active state, then a default location may be specified as a potential location (e.g., a voice mailbox, an electronic mail-box).

In alternate exemplary embodiments, presence based detection is not performed and all locations (e.g., accounts) associated with the receiving party are considered to be potential locations of the receiving party. Receiving party locations may include, but are not limited to: a mobile telephone, a business telephone, a home telephone, a PDA, a home Internet account, and business Internet account.

At block 106, the probability that the receiving party is located at each of the potential locations is calculated. The calculating utilizes a statistical model that is based on where the receiving party has been located in the past at a similar time and/or day of the week. In exemplary embodiments, the statistical model differentiates between whether the communication is a text communication (e.g., an instant message) or a voice communication (e.g., a telephone call) in calculating the probabilities. In alternate exemplary embodiments, no differentiation is made between text communication and voice communications. If the potential location with the highest probability is a text location and the communication is a voice communication, then a text message is sent alerting the receiving party of the incoming voice message. Alternatively, if the potential location with the highest probability is a voice location and the communication is a text communication, then a voice message is sent alerting the receiving party of the incoming text message/

In exemplary embodiments, the probability is calculated using Bayes theorem. Bayes theorem is a well known theorem that calculates the probability of an event occurring given that a related event has already occurred. Typically, when using Bayes theorem, the probability of the event occurring depends on three things: the probability of the event occurring on its own, regardless of whether the related event has occurred [P(A)]; the probability of the related event occurring on its own, regardless of the event occurring [P(B)]; and the probability of the related event occurring given that the event occurred [P(B|A). A version of Bayes theorem can be stated as P(A|B)=[P(B|A)P(A)]/[P(B)].

As applied to the calculating performed in block 106 of FIG. 1 the probability that the receiving party is at potential location "x" given that it is "10 a.m. on Tuesday" [P(X|T)] is equal to: [P(T|X)P(X)]/[P(T)]. P(T|X) is the probability that it is "10 a.m. on Tuesday" given that the receiving party is at potential location "x". P(X) is the probability of the receiving party being at potential location "x" regardless of the time of day and day of week. P(T) is the probability of it being "10 a.m. on Tuesday" regardless of which potential location the receiving party is located at. These probabilities are calculated based on where the receiving party has been located in the past at the same or similar time of day and/or day of week.

The range around the time of day and day of week may vary between implementations. In exemplary embodiments, the variation from the time of day and/or day of week may be utilized to produce the probability. For example, if the receiving party was located at a location at 2 p.m. on Tuesday, a current communication at 2:15 p.m. on Tuesday may have a higher probability of locating the receiving party at the location than a current communication at 2:30 p.m. on Tuesday. In alternate embodiments, any current communications within a one hour time period (or time slot) may have the same probability (e.g., all communications between 2:31 p.m. and 3:30 p.m.). A variety of configurations are possible depending on implementation requirements and the configurations may be modified after installation to tune the system.

The statistical model described herein is an example, and other parameters may be utilized by exemplary embodiments. In addition, other probability models, besides Bayes theorem and/or different variations of Bayes theorem may be utilized to determine the probability that the receiving party is located at a particular location based on where the receiving party has been located in the past.

At block 108 in FIG. 1, it is determined which of the potential locations has the highest probability of being the location that the receiving party is currently monitoring (or the location that the receiving party is located at). At block 110, routing the communication to the potential location with the highest probability is initiated. In exemplary embodiments, the communication is transmitted to the potential location with the highest probability via a network and the potential location is a user device (e.g., a personal computer, a mobile telephone, a PDA). In exemplary embodiments, an indicator is received from the location where the communication was routed. The indicator indicates whether the receiving party was located at the location where the communication was routed. In exemplary embodiments, the message is received by a VOIP server, Instant Messaging Server, or SMTP/IMAP4 server. Once the message is received, the media server will attempt to determine the destination of the message by placing a request, typically in XML/SOAP to the routing server. The routing server obtains the routing statistics from the local database that contains both routing destinations, such as "Home", "Cell", "Work", and the count of the number of times that the user's device has recorded presence at that device within a given time period. The routing server then uses the destination count information to compute the probability that the user would prefer a given device and command the media server to route to the most probable of the given locations. The statistical model is updated with this information. For example, if the receiving party was not located at the location where the communication was routed, then the probability may be lowered (e.g., for the time slot). In addition, if the receiving party was located at the location where the communication was routed, then the probability may be raised (e.g., for the time slot).

In exemplary embodiments, if the receiving party is not located at the potential location with the highest probability (as indicated by the indicator), then the communication is routed to the potential location with the second highest probability (if there is a second potential location). This process of continuing to route the communication to potential locations in order of highest probability to lowest probability may be continued until the receiving party is located or until there are no more potential locations. When there are no more potential locations, the communication may be routed to a default location such as a voice mailbox or electronic mailbox.

Figure 2:
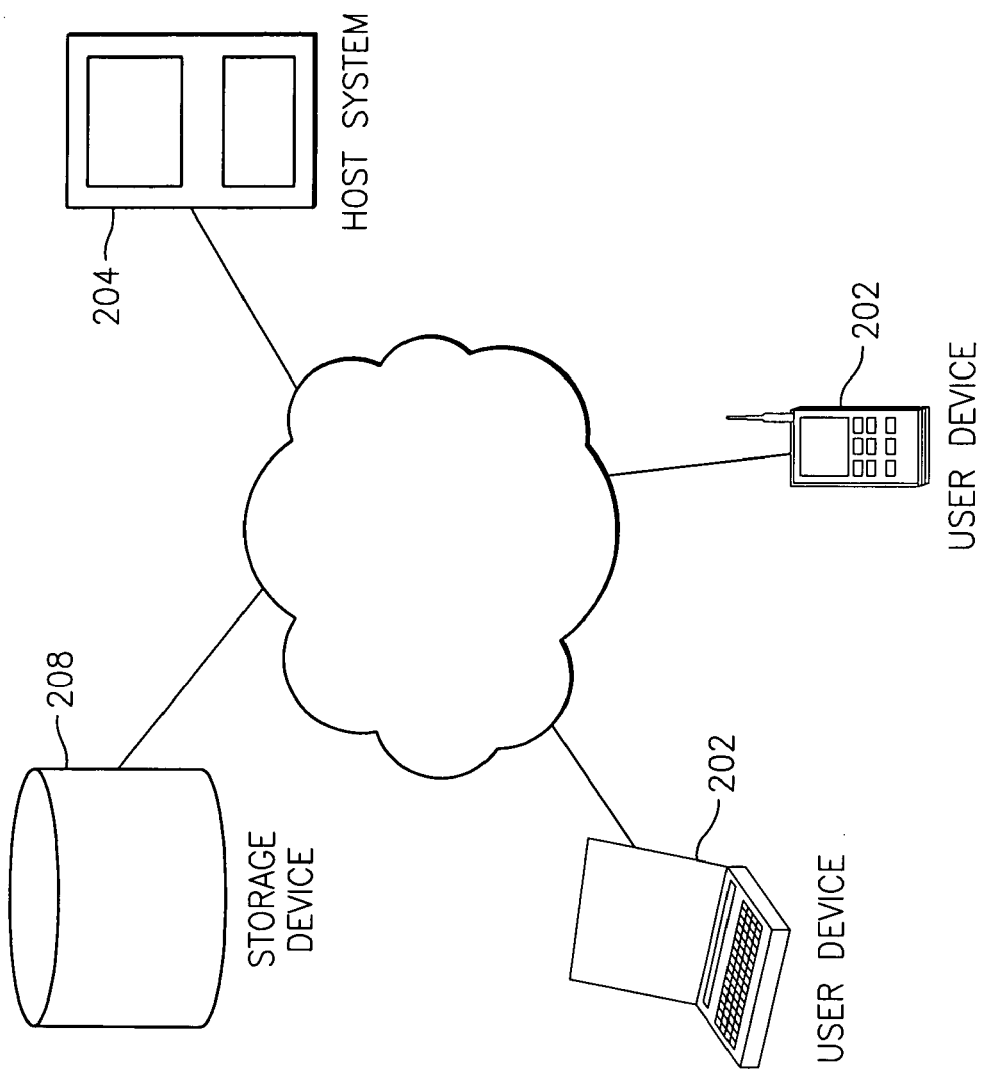
FIG. 2 is a block diagram of a system that may be utilized to route communications.

FIG. 2 is a block diagram of a system that may be utilized to provide routing of communications in accordance with exemplary embodiments. The system includes one or more user devices 202 through which receiving parties may receive a communication from a sending party. In exemplary embodiments of the present invention, the host system 204 executes the communication routing application to perform the functions described herein. The communication routing application may be implemented by software and/or hardware components. In alternate exemplary embodiments, the communication routing application described herein is built on top of an existing communication routing system such as, but not limited to: a JABBER instant messaging server, a VOIP server such as Broadworks by Broadsoft, or SMTP/IMAP4 server such as Exchange by Microsoft.

In exemplary embodiments, the user devices 202 are coupled to the host system 204 via a network 206. Each user device 202 may be implemented using a general-purpose computer executing a computer program for carrying out the processes described herein. The user devices 202 may be personal computers, lap top computers, personal digital assistants, pagers, cellular telephones, storage locations, host attached terminals, etc. with interfaces for communicating with the communication routing application. The interfaces may be implemented by interface screens, audio technology, voice recognition technology, or any other technology to allow the communication routing application to communicate with the user device 202. If the user devices 202 are personal computers (or include the required functionality), the processing described herein may be shared by a user device 202 and the host system 204 (e.g., by providing an applet to the user device 202) or contained completely within one or more of the user devices 202.

The network 206 may be any type of known network including, but not limited to, a wide area network (WAN), a local area network (LAN), a global network (e.g. Internet), a virtual private network (VPN), and an intranet. The network 206 may be implemented using a wireless network or any kind of physical network implementation. A user device 202 may be coupled to the host system 204 through multiple networks (e.g., intranet and Internet) so that not all user devices 202 are coupled to the host system 204 through the same network. One or more of the user devices 202 and the host system 204 may be connected to the network 206 in a wireless fashion.

The storage device 208 may be implemented using a variety of devices for storing electronic information. It is understood that the storage device 208 may be implemented using memory contained in the host system 204 or the user device 202 or it may be a separate physical device. The storage device 208 is logically addressable as a consolidated data source across a distributed environment that includes a network 206. Information stored in the storage device 208 may be retrieved and manipulated via the host system 204. The storage device 208 may include data such as the potential locations and statistical models for the user(s). Portions or all of the data may be located on electronic business cards such as VCards. These electronic business cards may be utilized to implement all or portions of the storage device 208. The storage device 208 may also include other kinds of data such as administrative information utilized by the communication routing application. In exemplary embodiments, the host system 204 operates as a database server and coordinates access to application data including data stored on storage device 208.

The host system 204 depicted in FIG. 2 may be implemented using one or more servers operating in response to a computer program stored in a storage medium accessible by the server. The host system 204 may operate as a network server (e.g., a web server) to communicate with the user device 202. The host system 204 handles sending and receiving information to and from the user device 202 and can perform associated tasks. The host system 204 may also include a firewall to prevent unauthorized access to the host system 204 and enforce any limitations on authorized access. For instance, an administrator may have access to the entire system and have authority to modify portions of the system. A firewall may be implemented using conventional hardware and/or software.

The host system 204 may also operate as an application server. The processor in the host system 204 executes one or more computer programs to implement the communication based routing application. Processing may be shared by the user device 202 and the host system 204 by providing an application (e.g., java applet) to the user device 202. Alternatively, the user device 202 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

As described above, the communication routing application may be utilized to transfer incoming telephone calls and messages to the receiving party. By using information about where the receiving party has been located in the past, the amount of time and resources spent routing from potential location to potential location can be minimized. The time and resources may be minimized by routing the communication to the location with the highest probability of being monitored by the receiving party.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While exemplary embodiments of the invention have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for determining routing for a communication, the method comprising:
    receiving a communication for a receiving party;
    determining one or more potential locations of the receiving party;
    calculating a probability that the receiving party is at each of the potential locations, the calculating responsive to a Bayesian statistical model based on where the receiving party has been located in the past at a similar time or day of the week of the receiving;
    determining which of the potential locations has the highest probability; and
    initiating routing of the communication to the potential location with the highest probability.

2. The method of claim 1 further comprising:
    receiving an indicator of whether the receiving party was located at the potential location with the highest probability; and
    updating the statistical model in response to the indicator.

3. The method of claim 2 wherein the statistical model is further updated in response to one or more of a time of day of the initiation of the routing and a day of week of the initiation of the routing.

4. The method of claim 2 further comprising:
determining which of the potential locations of the receiving party has the second highest probability in response to there being two or more potential locations of the receiving party and to the indicator indicating that the receiving party was not located at the potential location with the highest probability; and
initiating routing of the communication to the potential location with the second highest probability in response to there being two or more potential locations of the receiving party and to the indicator indicating that the receiving party was not located at the potential location with the highest probability.

5. The method of claim 1 wherein the communication is a voice communication or a text communication.

6. The method of claim 1 wherein the determining one or more potential locations of the receiving party includes performing presence detection for the receiving party.

7. The method of claim 6 wherein the determining one or more potential locations of the receiving party includes adding a default location as one of the potential locations when the presence detection does not detect any potential locations for the receiving party.

8. The method of claim 1 wherein the calculating is further responsive to a time of day of the receiving.

9. The method of claim 1 wherein the calculating is further responsive to whether the communication is a voice communication or text communication.

10. The method of claim 1 wherein the statistical model is a Bayesian model.

11. The method of claim 1 wherein the statistical model reflects locations where the receiving party was located in the past.

12. A system for determining routing for a communication, the system comprising:
a processor; and
computer instructions executing on the processor for facilitating:
receiving a communication for a receiving party;
determining one or more potential locations of the receiving party;
calculating a probability that the receiving party is at each of the potential locations, the calculating responsive to a Bayesian statistical model based on where the receiving party has been located in the past at a similar time or day of the week of the receiving;
determining which of the potential locations has the highest probability; and
initiating routing of the communication to the potential location with the highest probability.

13. The system of claim 12, wherein the instructions further facilitate:
receiving an indicator of whether the receiving party was located at the potential location with the highest probability; and
updating the statistical model in response to the indicator.

14. The system of claim 13 wherein the instructions further facilitate:
determining which of the potential locations of the receiving party has the second highest probability in response to there being two or more potential locations of the receiving party and to the indicator indicating that the receiving party was not located at the potential location with the highest probability; and
initiating routing of the communication to the potential location with the second highest probability in response to there being two or more potential locations of the receiving party and to the indicator indicating that the receiving party was not located at the potential location with the highest probability.

15. The system of claim 12 wherein the receiving is performed via a network.

16. The system of claim 12 wherein the potential locations include a user device.

17. A computer program product for determining routing for a communication, the computer program product comprising:
a storage medium readable by a processing circuit and storing instructions for execution by the processing circuit for facilitating a method comprising:
receiving a communication for a receiving party;
determining one or more potential locations of the receiving party;
calculating a probability that the receiving party is at each of the potential locations, the calculating responsive to a Bayesian statistical model based on where the receiving party has been located in the past at a similar time or day of the week of the receiving;
determining which of the potential locations has the highest probability; and
initiating routing of the communication to the potential location with the highest probability.

18. The computer program product of claim 17 wherein the method further comprises:
receiving an indicator of whether the receiving party was located at the potential location with the highest probability; and
updating the statistical model in response to the indicator.

19. The computer program product of claim 18 wherein the method further comprises:
determining which of the potential locations of the receiving party has the second highest probability in response to there being two or more potential locations of the receiving party and to the indicator indicating that the receiving party was not located at the potential location with the highest probability; and
initiating routing of the communication to the potential location with the second highest probability in response to there being two or more potential locations of the receiving party and to the indicator indicating that the receiving party was not located at the potential location with the highest probability.

20. The computer program product of claim 17 wherein the communication is a voice communication or a text communication.

* * * * *